United States Patent
Yu et al.

(10) Patent No.: US 12,236,555 B2
(45) Date of Patent: Feb. 25, 2025

(54) DEVICE AND METHOD FOR IMAGE DEMOSAICING

(71) Applicant: Advanced Micro Devices, Inc., Santa Clara, CA (US)

(72) Inventors: Linwei Yu, Shanghai (CN); Jiangli Ye, Shanghai (CN); Yang Ling, Shanghai (CN); Hui Zhou, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 306 days.

(21) Appl. No.: 17/561,267

(22) Filed: Dec. 23, 2021

(65) Prior Publication Data

US 2023/0186427 A1 Jun. 15, 2023

(30) Foreign Application Priority Data

Dec. 15, 2021 (CN) .......................... 202111533329.0

(51) Int. Cl.
*G06T 3/4015* (2024.01)
*G06T 11/00* (2006.01)
*G06V 10/56* (2022.01)

(52) U.S. Cl.
CPC .......... *G06T 3/4015* (2013.01); *G06T 11/001* (2013.01); *G06V 10/56* (2022.01)

(58) Field of Classification Search
None
See application file for complete search history.

(56) References Cited

U.S. PATENT DOCUMENTS

| 4,724,395 A | * | 2/1988 | Freeman | H04N 23/843 327/63 |
| 2005/0201616 A1 | * | 9/2005 | Malvar | G06T 3/4015 382/167 |
| 2007/0110300 A1 | * | 5/2007 | Chang | H04N 1/648 382/162 |

(Continued)

FOREIGN PATENT DOCUMENTS

| CN | 100571402 C | * | 12/2009 | ........... G06T 3/4015 |
| CN | 102630019 A | * | 8/2012 | |

(Continued)

OTHER PUBLICATIONS

Xiao Zhou, Fanfan Yang, Chunxiao Zhang and Chengyou Wang, "Improved adaptive demosaicking using directional weighting," 2014 9th International Conference on Computer Science & Education, Vancouver, BC, 2014, pp. 615-618, doi: 10.1109/ICCSE.2014.6926536.*

*Primary Examiner* — Jiangeng Sun
(74) *Attorney, Agent, or Firm* — Volpe Koenig

(57) ABSTRACT

A method and processing device for image demosaicing is provided. The processing device comprises memory and a processor. The processor is configured to, for a pixel of a Bayer image which filters an acquired image using three color components, determine directional color difference weightings in a horizontal direction and a vertical direction, determine a color difference between the first color component and the second color component and a color difference between the second color component and the third color component based on the directional color difference weightings, interpolate a color value of the pixel from the one color component and the color differences and provide a color image for display.

20 Claims, 9 Drawing Sheets

(56) References Cited

U.S. PATENT DOCUMENTS

| | | | |
|---|---|---|---|
| 2007/0247530 A1* | 10/2007 | Takahasi | H04N 23/843 |
| | | | 348/E9.051 |
| 2009/0115870 A1* | 5/2009 | Sasaki | H04N 23/843 |
| | | | 382/300 |
| 2009/0219417 A1* | 9/2009 | Tsuruoka | G06T 5/70 |
| | | | 348/241 |
| 2011/0043671 A1* | 2/2011 | Yamaguchi | G06T 1/00 |
| | | | 348/E5.091 |
| 2011/0090242 A1* | 4/2011 | Cote | G06T 3/4015 |
| | | | 345/597 |
| 2015/0221099 A1* | 8/2015 | Mishima | G06T 3/4015 |
| | | | 382/167 |
| 2018/0240215 A1* | 8/2018 | Knee | G06T 7/90 |

FOREIGN PATENT DOCUMENTS

| | | | | |
|---|---|---|---|---|
| CN | 110730336 A | * | 1/2020 | ......... H04N 9/04515 |
| JP | 2015149628 A | * | 8/2015 | ........... G06T 3/4015 |

\* cited by examiner

DEVICE AND METHOD FOR IMAGE DEMOSAICING

CROSS REFERENCE TO RELATED APPLICATION

This application claims priority to Chinese Patent Application No. 202111533329.0, filed Dec. 15, 2021, the entire contents of which is hereby incorporated by reference as if fully set forth herein.

BACKGROUND

Digital imaging uses image sensors comprised of individual photosensors which capture the intensity (i.e., brightness information) of the light received at each photosensor but which are not able to capture the selected wavelength (i.e., color information) of the light. Accordingly, image sensors are typically overlaid with a color filter array comprised of individual color filters to render the color information.

Each photosensor corresponds to a pixel of an image having a brightness value and color value used to represent the brightness and color of the light received at each photosensor. The color filter arrays cover the photosensors to capture the color information of the light received at each photosensor. The color values of the pixels are stored, as raw data (i.e., data, which is not interpolated, encoded or compressed), according to a variety of different RAW formats.

BRIEF DESCRIPTION OF THE DRAWINGS

A more detailed understanding can be had from the following description, given by way of example in conjunction with the accompanying drawings wherein.

DETAILED DESCRIPTION

Figure 1:
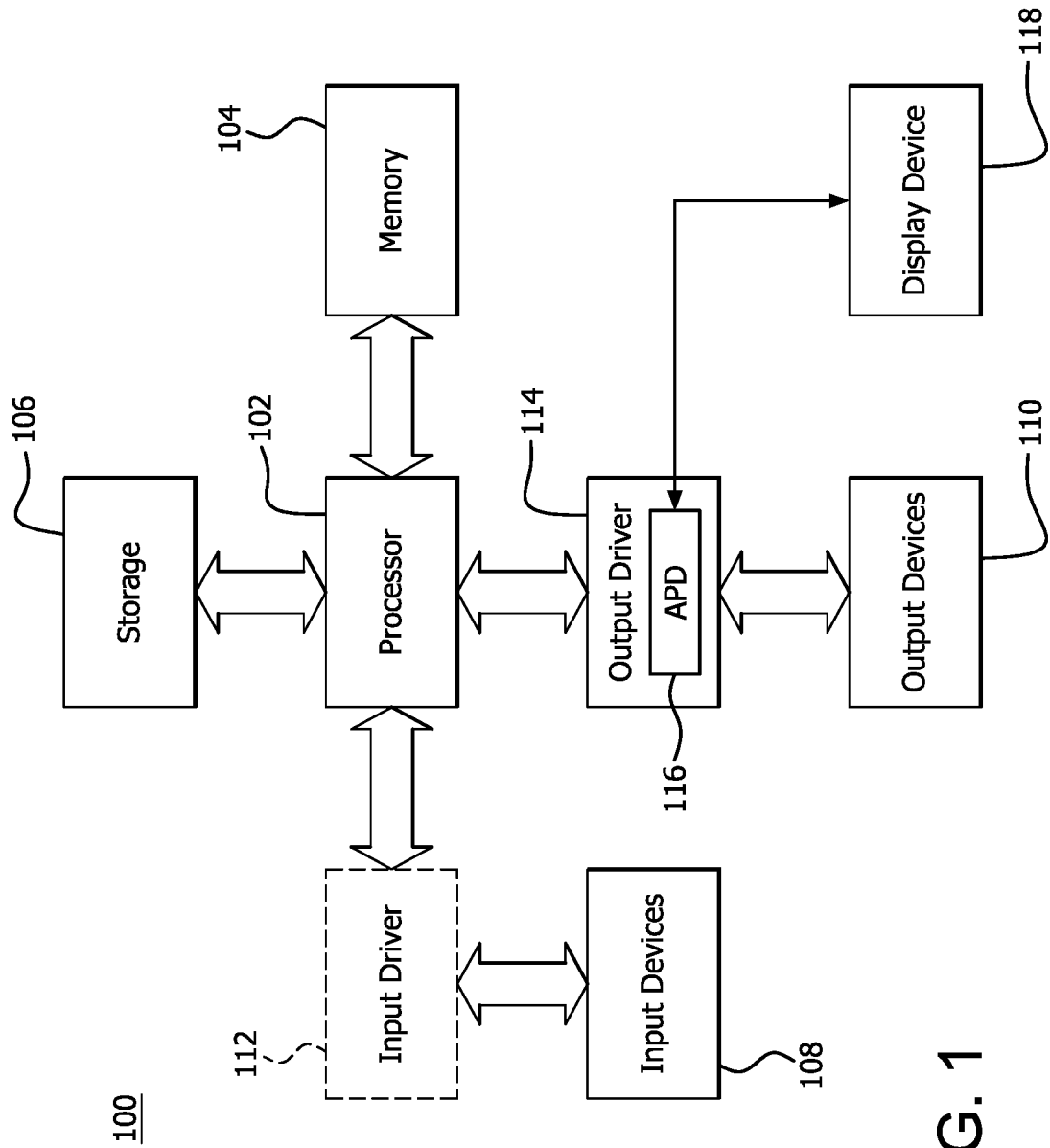
FIG. 1 is a block diagram of an example device in which one or more features of the present disclosure can be implemented.

The input data of a conventional image signal processing (ISP) pipeline are frames of color filtered image data comprising pixels. Typical components of an ISP pipeline include color interpolation (i.e., interpolates red (R), green (G) and blue (B) values for each pixel), color correction (i.e., correct color values), gamma correction (i.e., change from linear to non-linear space) and color space conversion (e.g., transform from a RGB color format to a YUV format). More complex ISP pipelines also include noise reduction, lens shading compensation, using a 3 dimensional look up table (3DLUT) for mapping color spaces, image sharpening, image cropping and image scaling. The YUV pixel data can be then compressed, transmitted, decoded and displayed, depending on the applications.

The image sensor typically includes a Bayer color filter array. Correspondingly, the output of image sensors of the Bayer color filter array is color filtered data. For an ISP pipeline, the raw image color filtered data is then converted to a full-color image by a particular interpolation technique tailored to the pattern of the Bayer color filter array.

A Bayer image (color filtered image resulting from a Bayer color filter array) represents pixels using three color components (e.g., R, G and B). Each pixel of a frame is represented by one of the three color components, while the other two color components are missing from each corresponding pixel. The ISP pipeline includes a demosaicing process, which interpolates the missing colors and converts the Bayer image to a full resolution color image in 3 color planes for display.

Conventional demosaicing algorithms and ISP processing devices that are used to interpolate the pixels of a Bayer image (image produced by a Bayer color filter array) often result in output color images or video frames which suffer from loss of fine structures (e.g., blurry edges), zippering (e.g., alternating patterns) and high frequency contents (pixel values that rapidly change in space), which introduce artifacts in the image.

For example, conventional demosaicing (i.e., interpolation) techniques include using pre-designed filters which are applied to a sliding window of a Bayer image. Depending on the output of the color filter array, each pixel is classified into several classifications, such as a flat area, a textured area and an edge area. Then, different demosaicing algorithms (i.e., interpolation algorithms) are employed to reconstruct the missing color components according to the result of classifications. However, these techniques are inefficient because the filters must be well designed, the classifiers need fine-tuned parameters in various scenarios to distinguish different areas properly, and interpolation methods at different areas require careful design.

In addition, because one color component (typically the G component) is sampled for the Bayer image more than the other two color components, (e.g., the R component and the B component) and provides more precise gradients than the R and B components, conventional demosaicing algorithms first interpolate the missing G components and then use the full-resolution G component to interpolate the R and B components, requiring additional clock cycles and more power consumption to complete.

Features of the present disclosure include processing devices and methods of demosaicing a Bayer image using a one direction linear model and directional weighting fusion.

An image processing device is provided which comprises memory and a processor. The processor is configured to, for a pixel of a Bayer image which filters an acquired image using three color components, determine directional color difference weightings in a horizontal direction and a vertical direction, determine a color difference between a first color component and a second color component and a color difference between a second color component and a third color component based on the directional color difference weightings, interpolate a color value of the pixel from the one color component and the color differences and provide a color image for display.

A method of image demosaicing is provided which comprises, for a pixel of a Bayer image, determining directional color difference weightings in a horizontal direction and a vertical direction, determining a color difference between a first color component and a second color component and a color difference between the second color component and the third color component based on the directional color difference weightings, interpolating a color value of the pixel from the one color component and the color differences and providing a color image for display.

An image processing device is provided which comprises an image capturing device configured to capture an image and an image sensor comprising a Bayer color filter array configured to color filter the image according to a first color component, a second color component and a third color component. The image processing device also comprises a processor configured to, for a pixel of the Bayer image represented as one of the first color component, the second color component and the third color component, determine directional color difference weightings in a horizontal direction and a vertical direction, determine a color difference between the first color component and the second color component and a color difference between the second color component and the third color component based on the directional color difference weightings and interpolate a color value of the pixel from the one color component and the color differences FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
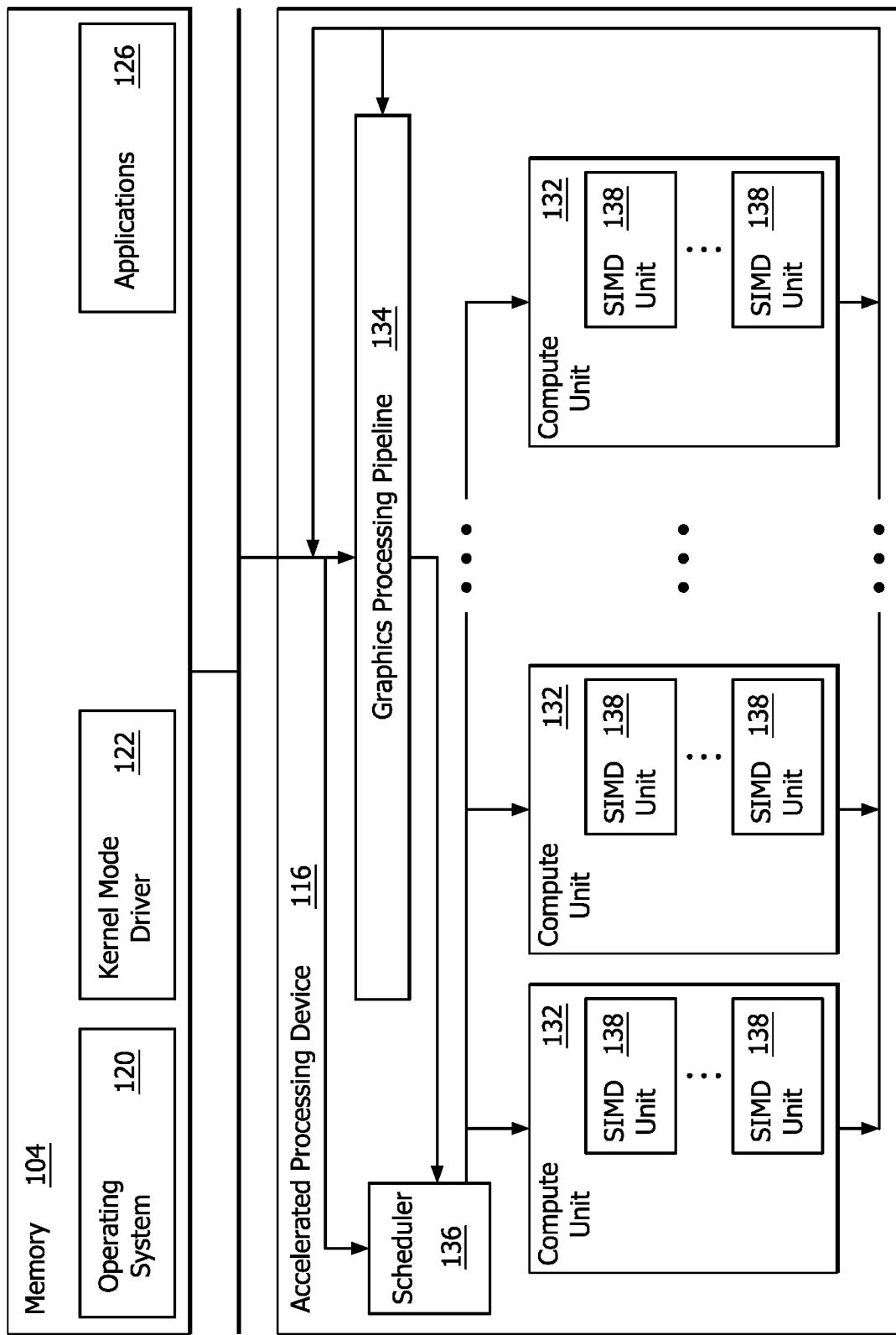
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as ISP operations and graphics operations that may be suited for parallel processing. The APD 116 can be used for executing ISP pipeline operations such as pixel operations (e.g., channel resampling and interpolation), geometric computations, and rendering an image to display device 118 based on commands received from the processor 102. The APD 116 also executes compute processing operations that are not directly related to ISP and graphics operations, such as operations related to physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for ISP and graphics related operations such as pixel value calculations, pixel value interpolation, vertex transformations, and other ISP and graphics operations. Thus in some instances, an ISP pipeline 134, which accepts ISP processing commands from the processor 102, provides computation tasks to the compute units 132 for execution in parallel.

The compute units 132 are also used to perform computation tasks not related to ISP and graphics or not performed as part of the "normal" operation of an ISP pipeline 134 (e.g., custom operations performed to supplement processing performed for operation of the ISP pipeline 134). An application 126 or other software executing on the processor 102 transmits programs that define such computation tasks to the APD 116 for execution.

Figure 3:
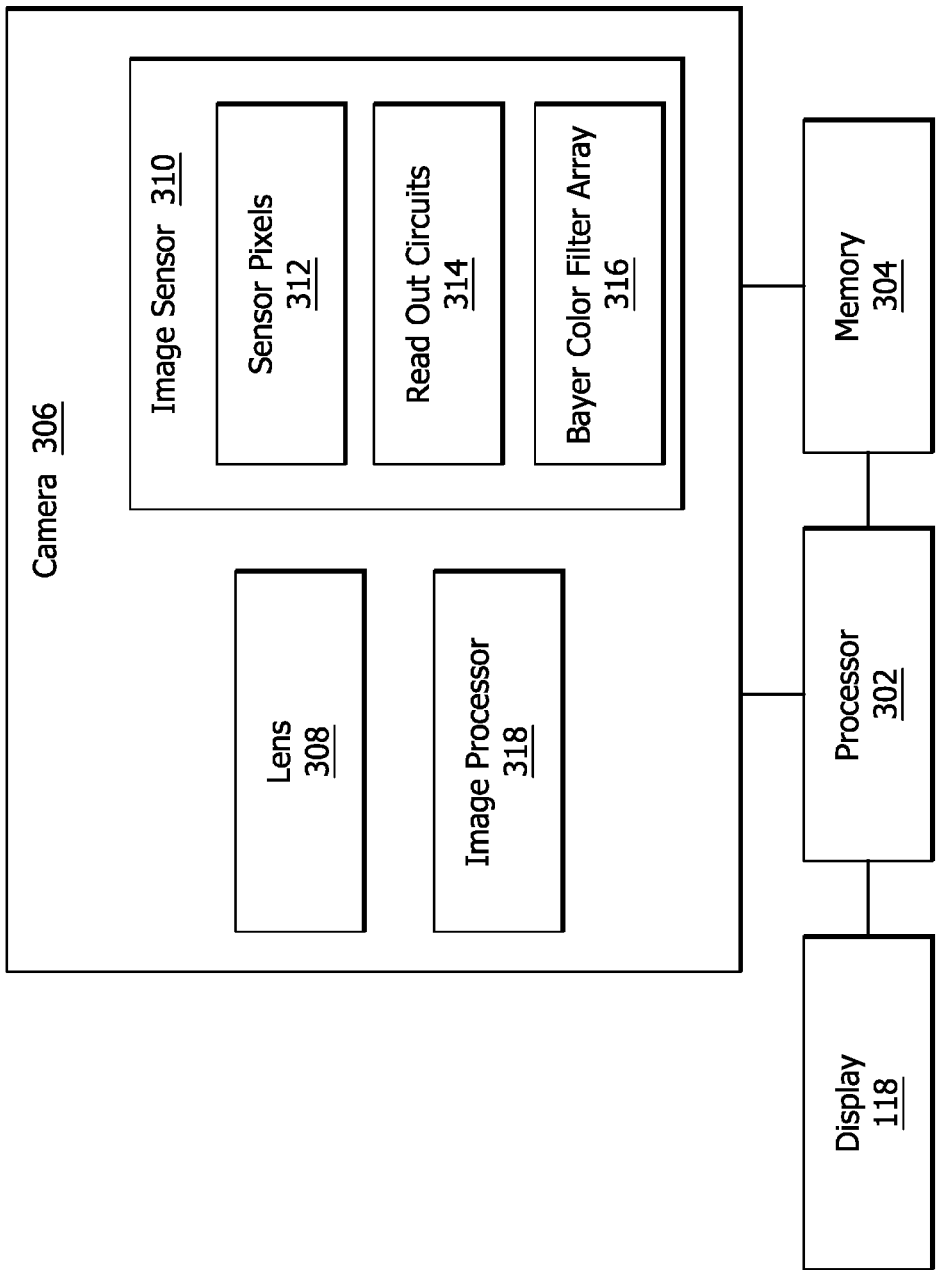
FIG. 3 is a block diagram illustrating example components of a processing device in which one or more features of the present disclosure can be implemented.

FIG. 3 is a block diagram illustrating example components of a processing device 300 in which one or more features of the disclosure can be implemented. As shown in FIG. 3, processing device 300 includes processor 302, memory 304 and camera 306. Camera 306 includes lens 308, image sensor 310 and image signal processor 318. Image sensor 310 incudes of sensor pixels 312, read-out circuits 314 (e.g., including an analog to digital converter (ADC) circuit) and Bayer color filter array 316. In some examples, image processor 318 is integrated as part of processor 302, instead of camera 306.

Lens 308 includes a single lens or an assembly of lenses which collects light reflected from objects and/or light directly transmitted from illuminants. Image sensor 310 is, for example, a complementary metal-oxide-semiconductor (CMOS) based image sensor, which includes an array of cells, each corresponding to a pixel of an image (i.e., frame). Image sensor 310 is configured to expose the pixels to light passing through lens 308. The light passed through the corresponding color filter array 316 at each cell and captured at each cell is transformed into electrons having a value (i.e., an accumulated charge). The charge (i.e., analog value) of each cell is read out, during a read-out time, and sent to read out circuits 314, which converts the analog values into digital values.

Image processor 318 controls the exposure timing of the image sensor 310 (e.g., the delay time period between the exposures of each frame or between lines of a frame) such that time difference between the start of each readout time period is at least sufficient for the readout circuit to read out each line. The frame rate of the video is also controlled by controlling the exposure timing of the lines of each frame.

Processor 302 is configured to control both the exposure timing of the image sensor 310 (e.g., via image processor 318) and image processor 318. Processor 302 is also configured to perform a plurality of functions as described herein. For example, processor 302 is configured to interpolate missing pixel color values of a Bayer image using a one direction linear model and directional weighting fusion.

Processor 302 is also in communication with display device 118 (e.g., in communication with a display controller (not shown) which controls the operation of the display device 118) for displaying images captured by camera 306.

Figure 4:
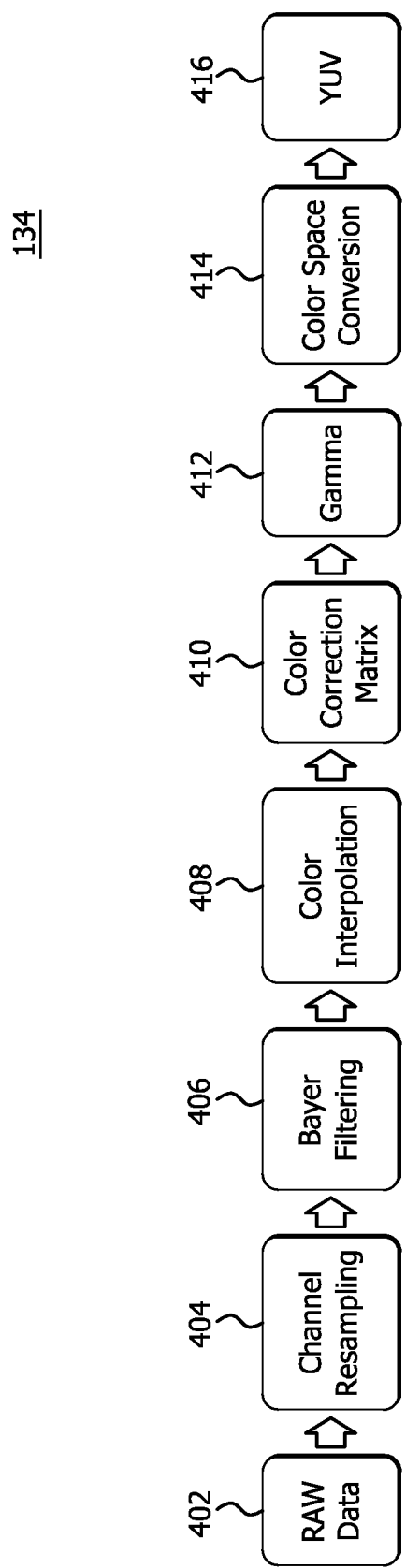
FIG. 4 is a block diagram illustrating an example flow of processing images via an ISP pipeline according to features of the present disclosure.

FIG. 4 is a block diagram illustrating an example flow of processing images via an ISP pipeline 134 according to features of the present disclosure. As shown at block 402 of FIG. 4, raw image data is received at the pipeline 134. The raw image data is color filtered data resulting from the image sensor 310.

The raw image data (e.g., non-processed data) is resampled, at block 404, and Bayer filtered, by the Bayer color filter array 316, according to a Bayer HDR format (i.e., HDR fused) at block 406 to produce a Bayer image.

Figure 5:
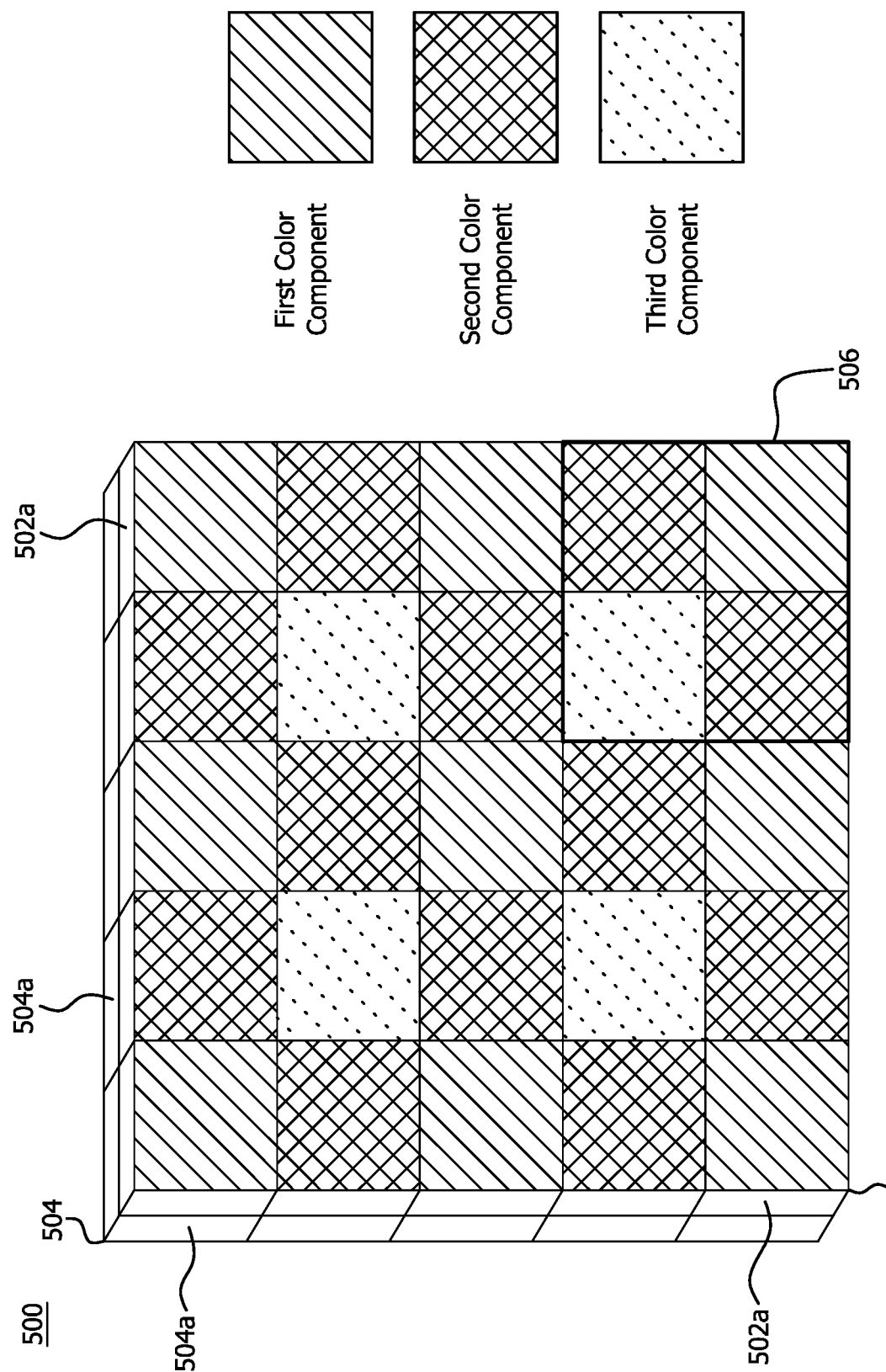
FIG. 5 is an illustration of an example portion of a Bayer color filter array of an image sensor.

FIG. 5 is an illustration of an example portion of an image sensor 500 comprising a Bayer color filter array 502 (i.e., a Bayer color filter mosaic) and a pixel sensor array 504. The Bayer color filter array 502 (i.e., front portion of image sensor 500 shown in FIG. 5) includes a plurality of color filters 502a defining a color filter pattern. The pixel sensor array 504 (i.e., back portion of image sensor 500 shown in FIG. 5) includes a plurality of or photosensors or pixel sensors (i.e., pixels) 504a. Each color filter 502a is disposed over a pixel 504a of the pixel sensor array 504 to capture color information for each corresponding pixel 504a in the Bayer image. The portion of the Bayer color filter array 502 shown in FIG. 5 includes an array of 5 columns and 5 rows of color filters (i.e., a 5×5 block). The size of the portion of the Bayer color filter array 502 shown in FIG. 5 is merely an example used for simplified explanation.

The color filters 502a filter light, sensed by the pixel sensors 504a, by wavelength range, such that the separate filtered intensities include information about the color of light. The Bayer color filter array 502 provides information about the intensity of the light in R, G, and B wavelength regions. That is, the light for each pixel 504a of an image is filtered to record one of three different color components (i.e., a first color component, a second color component and a third color component shown in FIG. 5).

The three different color components include an R component, a G component and a B component. Typically, the second color component is selected as the G component, which is the dominant part of luminance, while the first color component and the third color component correspond to the R component and B component, respectively. Accordingly, as shown in the color filter pattern at FIG. 5, for each 2×2 block 506, the second color component (e.g., G component) is sampled twice as much as the first component (e.g., R component) and the second color component (e.g., B component). The resulting raw color filtered data is referred to as the Bayer pattern image (i.e., Bayer image). Because each pixel 504a is filtered to record only one of three colors, the color information of each pixel 504a in the Bayer image cannot represent the R, G and B color values of the pixel 502a. Therefore, the pixels 504a of the Bayer image are color interpolated, at block 408, by using demosaicing algorithms which estimate the color values for each pixel from surrounding pixels of corresponding colors.

After the Bayer image is color interpolated, the pixels 504a are processed according to other components of the ISP pipeline 410, 412, 414 and 416 shown in FIG. 4. That is, the pixels are color corrected, at block 410 and gamma corrected at block 412. Color space conversion is then performed at block 414 to convert the pixels 504a from RGB color space to a YUV color space at block 416. In more sophisticated ISP pipeline, additional image processing blocks can be added to the ISP pipeline 134 (e.g., added between any two of the blocks: 402, 404, 406, 408, 410, 412, 414, and 416 in ISP pipeline 134). The images are then transmitted, decoded and displayed on a display device, such as display device 118 shown in FIG. 1.

As described above, conventional demosaicing techniques (i.e., color interpolation at block 408 in FIG. 4) used to interpolate pixel colors of the pixels in the Bayer image include using pre-designed filters which are applied to a sliding window on a Bayer image. Depending on the output of the Bayer color filter array 502, each pixel 504a is classified into several classifications, such as for example a flat area, a textured area and an edge area. Then, different demosaicing algorithms (i.e., interpolation algorithms) are employed to reconstruct the missing color components according to the result of classifications. However, these techniques are inefficient because the filters must be well designed, the classifiers need fine-tuned parameters in various scenarios to distinguish different areas properly, and interpolation methods at different areas require careful design.

In addition, the second color components (e.g., G component) are sampled more than the first color component (e.g., R component) and the third color component (e.g., B component) and provide more precise gradients than the first and third color components. Accordingly, conventional demosaicing algorithms first interpolate the missing second color components (e.g., G component) and then use the full-resolution second color component to interpolate the first and third color components, requiring additional clock cycles and more power consumption to complete.

As described in more detail below with reference to FIGS. 6 to 9B, features of the present disclosure include processing devices and methods of demosaicing a Bayer image using a one-direction linear model and directional weighting fusion.

Figure 6:
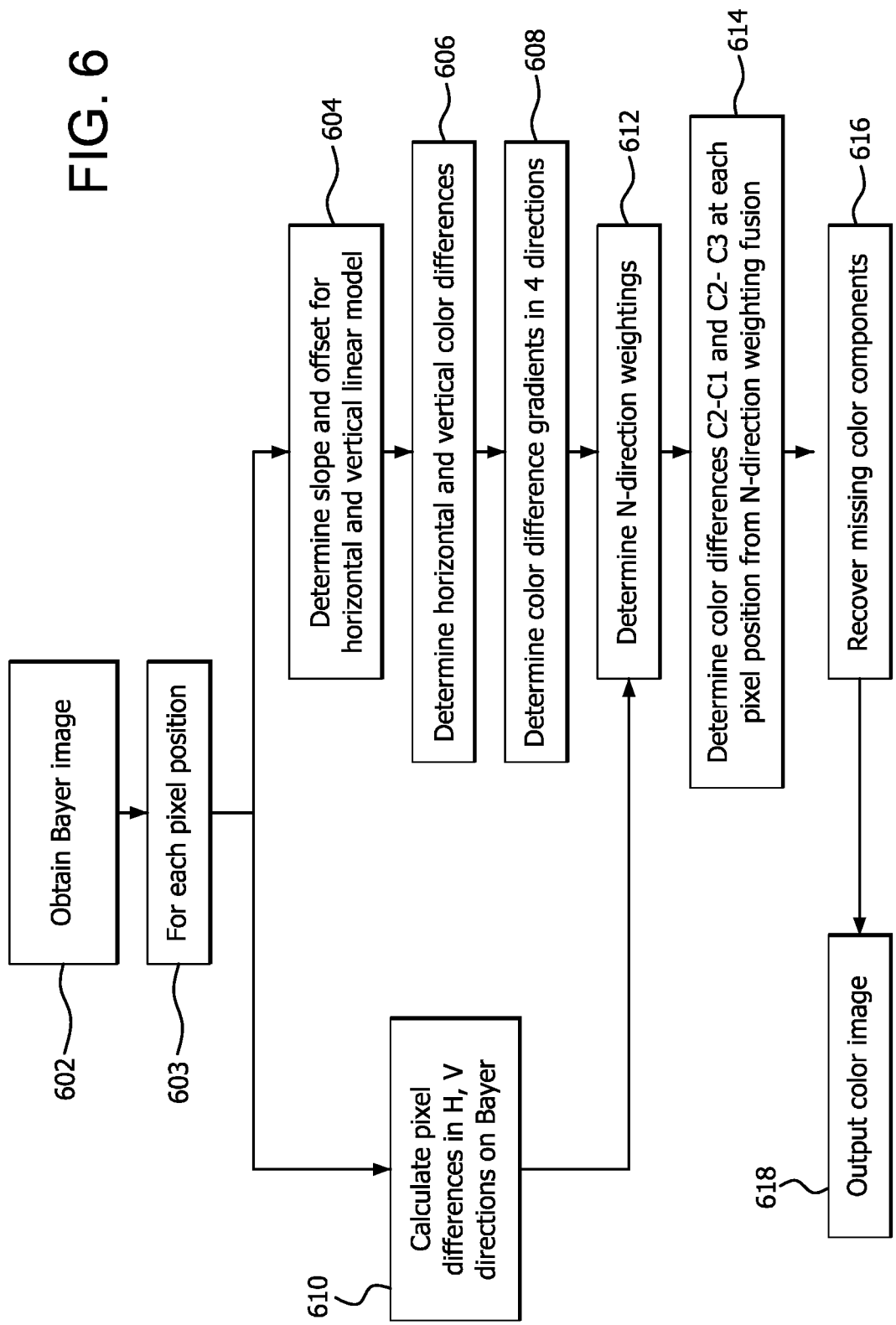
FIG. 6 is a flow diagram illustrating an example method of image demosaicing according to features of the present disclosure.

FIG. 6 is a flow diagram illustrating an example method of image demosaicing according to features of the present disclosure;

As shown at block 602, the method 600 includes obtaining a Bayer image. For example, a Bayer image resulting from the Bayer color filter array 500 shown in FIG. 5 is received by a processor (e.g., processor 302 in FIG. 3).

Blocks 604-618 are performed for each pixel position, at block 603, of the Bayer image. As shown at block 604, the method 600 includes, determining a horizontal slope and offset and a vertical slope and offset using a linear model.

Figure 7:
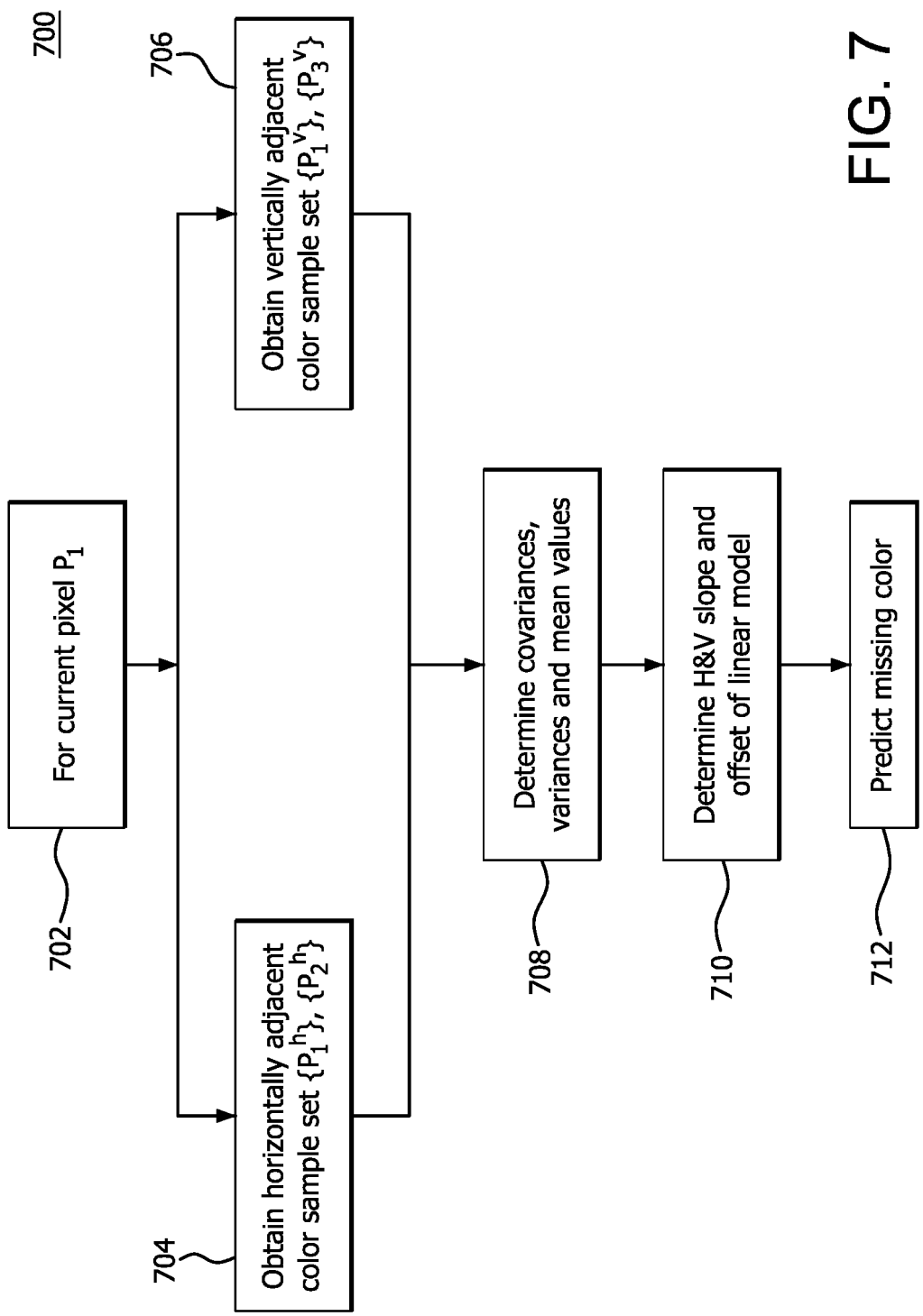
FIG. 7 is a flow diagram illustrating an example method of determining a horizontal slope and offset and a vertical slope and offset according to features of the present disclosure.
Figure 8:
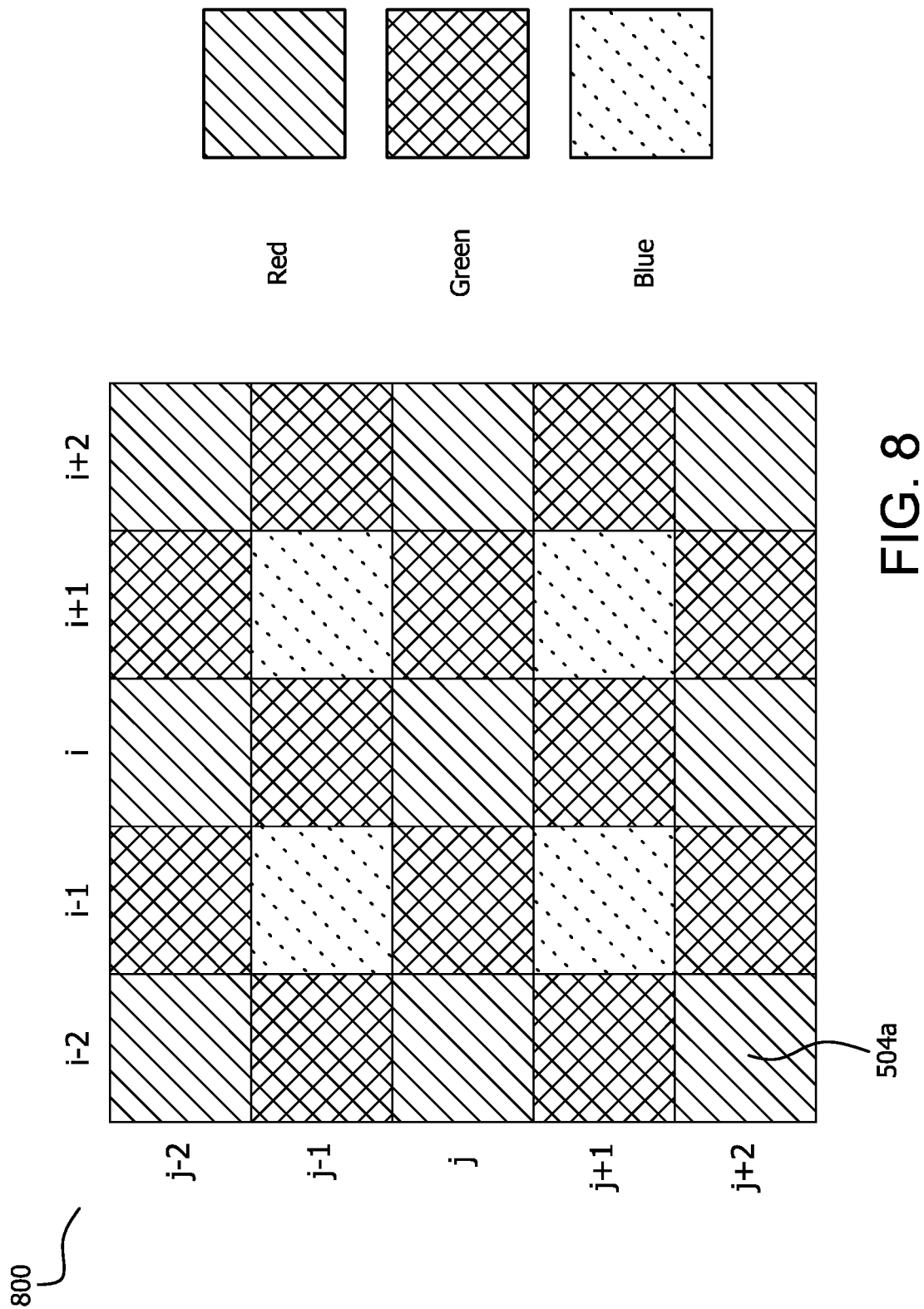
FIG. 8 is an illustration of an example portion of a Bayer image used for implementing features of the present disclosure.

FIGS. 7 and 8 are used together to describe determining the horizontal and vertical slope and offset of the Bayer image shown at block 604. FIG. 7 is a flow diagram illustrating an example method 700 of determining the horizontal and vertical slope and offset shown at block 604 in FIG. 6. As described in more detail below, the color differences are determined in method 700 using a linear model, in which linear interpolation coefficients k (for slope) and b (for offset) are adaptively determined using a local variance and a local co-variance.

FIG. 8 is an illustration of an example portion of a Bayer image 800 used for implementing features of the present disclosure. The color component pattern shown in FIG. 8 is the same as the pattern shown in FIG. 5.

Each pixel 504a in the pattern in FIG. 8 corresponds to a different pixel position in the Bayer image 800. The pattern includes an array of 5 columns of pixels 504a and 5 rows of pixels 504a (i.e., a 5×5 array). The size of the array shown in FIG. 8 is merely an example used for simplified explanation. Features of the present disclosure can be implemented for arrays having a size different from the size of the array shown in FIG. 8.

As shown in FIG. 8, the first row (i.e., top row) of pixels 504a is denoted as row j−2, the second row of pixels 504a is denoted as row j−1, the third row (i.e., middle row) of pixels 504a is denoted as row j, the fourth row of pixels 504a is denoted as row j+1 and the fifth row (i.e., bottom row) of pixels 504a is denoted as row j+2, The first column (i.e., left column) of pixels 504a is denoted as column i−2, the second column of pixels 504a is denoted as column i−1, the third column (i.e., middle column) of pixels 504a is denoted as column i, the fourth column of pixels 504a is denoted as column i+1 and the fifth column (i.e., right column) of pixels 504a is denoted as column i+2, Blocks 704-712 are performed for each pixel 504a in the Bayer image. However, for simplification purposes, the method 700 is described for predicting the color for a current pixel $P_1$, at block 702, corresponding to the middle pixel position (j, i) of the array shown in FIG. 8. As described above, because each pixel 504a is filtered to record only one of three colors, the color information of each pixel 504a in the Bayer image cannot represent each of the R, G and B color values of each pixel 502a. Accordingly, the color represented in a Bayer image varies between pixels (i.e., color is location variant). Therefore, the horizontally adjacent color sample sets $P_1^h$ and $P_2^h$ (i.e., color sample sets of the pixels to the left and right of pixel $P_1$) are determined at block 704 as:

$$P_1^h = \{P_1^h(j,i-1), P_1^h(j,i), P_1^h(j,i+1)\}$$

$$P_2^h = \{P_2(j,i-1), P_2^h(j,i), P_2(j,i+1)\}$$

where h is horizontal, $P_2$ is the color of the horizontally adjacent pixels, and $$P_1^h(j,i-1) = (P_1(j,i-2) + P_1(j,i))/2$$

$$P_1^h(j,i+1) = (P_1(j,i+2) + P_1(j,i))/2$$

$$P_2^h(j,i) = (P_2(j,i-1) + P_1(j,i+1))/2$$

That is, when the center pixel is the current pixel $P_1$, the color of the pixel to the left of pixel $P_1$ (i.e., $P_1^h(j,i-1)$) is the average of the color value of the pixel to the left of pixel $P_1$ (j,i−1) and the color value of the center pixel $P_1$(j,i)). The color of the pixel to the right of pixel $P_1$ (i.e., $P_1^h$ (j,i+1)) is the average of the color value of the pixel to the right of pixel $P_1$ (j,i+1) and the color value of the center pixel $P_1$ (j,i). Then, $P_2^h$ (j,i) is determined as the average of $P_2$ (j,i−1) and $P_1^h$ (j,i+1).

Similarly, the vertically adjacent color sample sets $P_1^v$ and $P_2^v$ (i.e., colors of the pixels above and below pixel $P_1$) are determined at block 706 as:

$$P_1^v = \{P_1^h(j-1,i), P_1(j,i), P_1^v(j+1,i)\}$$

$$P_3^v = \{P_3(j-1,i), P_3^v(j,i), P_3(j+1,i)\}$$

where v is vertical, $P_3$ is the color of the vertically adjacent pixels, and $$P_1^v(j-1,i) = (P_1(j-2,i) + P_1(j,i))/2$$

$$P_1^v(j+1,i) = (P_1(j+2,i) + P_1(j,i))/2$$

$$P_3^v(j,i) = (P_3(j-1,i) + P_3(j+1,i))/2$$

That is, when the center pixel is the current pixel $P_1$, the color of the pixel above the center pixel $P_1$ (i.e., $P_1^v$ (j−1,i)) is the average of the color value of the pixel above the pixel $P_1$ (j,i−1) and the color value of the center pixel $P_1$ (j,i)). Also, the color of the pixel below pixel $P_1$ (i.e., $P_1^v$ (j+1,i)) is the average of the color value of the pixel below pixel $P_1$(j,i+1) and the color value of the center pixel $P_1$(j,i). Then, $P_3^v$(j,i) is determined as the average of $P_3$ (j−1,i) and $P_3$ (j+1,i).

The example described above uses three samples. However, a color set can be extended from 2 or more samples.

As shown at block 708, covariances, variances and mean values are then determined from the adjacent color sample sets $P_1^h$ and $P_2^h$. That is, the horizontal covariance (cov $\{P_1^h, P_2^h\}$), the horizontal variance (var $\{P_1^h\}$), and the horizontal mean values (mean $\{P_1^h\}$) and mean $\{P_2^h\}$) are determined and the vertical covariance (cov $\{P_1^v, P_2^v\}$), the vertical variance (var $\{P_1^v\}$), and the vertical mean values (mean $\{P_1^v\}$) and (mean $\{P_2^v\}$) are determined.

The horizontal (H) and vertical (V) slope k and offset b of the linear model are determined at block 710. The slope k and offset b of the linear model are determined as follows:

$$k^h = \frac{\text{cov}(\{P_1^h\}, \{P_2^h\})}{\text{var}\{P_1^h\}}, \quad b^h = \overline{P_2^h} - k^h \times \overline{P_1^h}$$

$$k^v = \frac{\text{cov}(\{P_1^v\}, \{P_3^v\})}{\text{var}\{P_1^v\}}, \quad b^v = \overline{P_3^v} - k^v \times \overline{P_1^v}$$

The horizontal linear model gives the horizontal prediction $P_2^h$ of color $P_2$ at position (j,i) as: $P_2^h$ (j,i)=$k^h \times P_1$ (j,i)+$b^h$. The vertical linear model gives the vertical prediction $P_3^v$ of color $P_3$ at FIG. 8, position (j,i) as: $P_3^v$ (j,i)=$k^v \times P_1$ (j,i)+$b^v$.

The missing colors are then predicted at block 712. The colors $P_1$, $P_2$ and $P_3$ are variant depending on location. For example, with reference to the Bayer image 800 in FIG. 8, at position (j,i), $P_1$=R, $P_2$=G and $P_3$=G. This position is referred to as R position. At position (j,i+1), $P_1$=G, $P_2$=R and $P_3$=B. This position is referred to as GR position (i.e., G at R row). At position (j+1,i), $P_1$=G, $P_2$=B, $P_3$=R. This position is referred to as GB position, (i.e., G at B row). At position (j+1,i+1), P1=B, P2=G, P3=G. This position is referred to as B position.

Based on the horizontal and vertical color differences determined at block 606, the color difference gradients are determined in 4 directions at block 608. The color difference gradient in the east direction $\Delta_E$ (i.e., right direction) is determined as follows:

$$\Delta_E = (\eta_0 \times |\xi^h(j-1,i) - \xi^h(j-1,i+1)| + \eta_1 \times [\xi^h(j-1,i+1) - \xi^h(j-1,i+1)] + 2\eta_0 \times |\xi^h(j,i) - \xi^h(j,i+1)| + 2\eta_1 \times [\xi^h(j,i+1) - \xi^h(j,i+1)] + \eta_0 \times |\xi^h(j+1,i) - \xi^h(j+1,i+1)| + \eta_1 \times [\xi^h(j+1,i+1) - \xi^h(j+1,i+1)])/(2\eta_0 + 2\eta_1)$$

The color difference gradients are similarly determined in the three remaining directions processor is configured to: (i.e., the west, north and south directions. For example, the color difference gradients in the west direction $\Delta_W$ (i.e., the left direction), the north direction $\Delta_N$ (i.e., up direction) and the south direction $\Delta_S$ (i.e., down direction) are determined as follows:

$$\Delta_W = (\eta_0 \times |\xi^h(j-1,i) - \xi^h(j-1,i-1)| + \eta_1 \times [\xi^h(j-1,i-1) - \xi^h(j-1,i-2)] + 2\eta_0 \times |\xi^h(j,i) - \xi^h(j,i-1)| + 2\eta_1 \times [\xi^h(j,i-1) - \xi^h(j,i-2)] + \eta_0 \times |\xi^h(j+1,i) - \xi^h(j+1,i-1)| + \eta_1 \times [\xi^h(j+1,i-1) - \xi^h(j+1,i-2)])/(2\eta_0 + 2\eta_1)$$

$$\Delta_N = (\eta_0 \times |\xi^h(j,i-1) - \xi^h(j-1,i-1)| + \eta_1 \times [\xi^h(j-1,i-1) - \xi^h(j-2,i-1)] + 2\eta_0 \times |\xi^h(j,i) - \xi^h(j-1,i)| + 2\eta_1 \times [\xi^h(j-1,i) - \xi^h(j-2,i)] + \eta_0 \times |\xi^h(j,i+1) - \xi^h(j-1,i+1)| + \eta_1 \times [\xi^h(j-1,i+1) - \xi^h(j-2,i+1)])/(2\eta_0 + 2\eta_1)$$

$$\Delta_S = (\eta_0 \times |\xi^h(j,i-1) - \xi^h(j+1,i-1)| + \eta_1 \times [\xi^h(j+1,i-1) - \xi^h(j+2,i-1)] + 2\eta_0 \times |\xi^h(j,i) - \xi^h(j+1,i)| + 2\eta_1 \times [\xi^h(j+1,i) - \xi^h(j+2,i)] + \eta_0 \times |\xi^h(j,i+1) - \xi^h(j+1,i+1)| + \eta_1 \times [\xi^h(j+1,i+1) - \xi^h(j+2,i+1)])/(2\eta_0 + 2\eta_1)$$

where $\eta_0$ and $\eta_1$ both have a default value=1, but the values of $\eta_0$ and $\eta_1$ can be changed for different tuning parameters.

Referring back to FIG. 6, the horizontal and vertical color differences are determined at block 606 as follows:

$$\xi^h(j,i) = \begin{cases} P_1(j,i) - \hat{P}_2^h(j,i) & \text{if } P_1 = \text{green} \\ \hat{P}_2^h(j,i) - P_1(j,i) & \text{if } P_2 = \text{green} \end{cases}$$

$$\xi^v(j,i) = \begin{cases} P_1(j,i) - \hat{P}_3^v(j,i) & \text{if } P_1 = \text{green} \\ \hat{P}_3^v(j,i) - P_1(j,i) & \text{if } P_3 = \text{green} \end{cases}$$

where $\xi^h$ (j,i) denotes the horizontal color difference at (j,i) and $\xi^v$ (j,i) denotes the vertical color difference at (j,i).

Figure 9B:
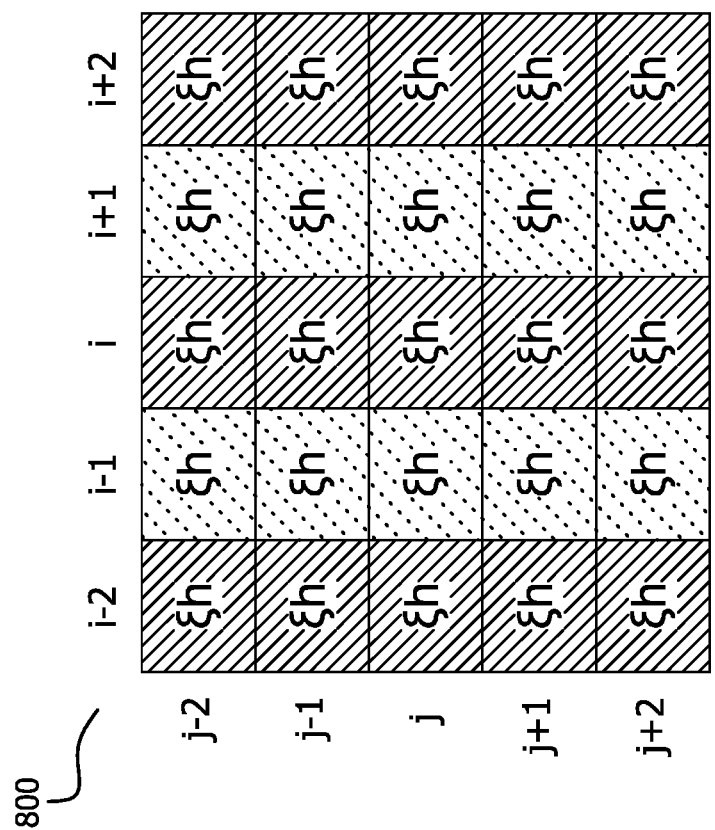
FIG. 9B illustrates the vertical color differences at the pixel positions of the portion of the Bayer image.
Figure 9A:
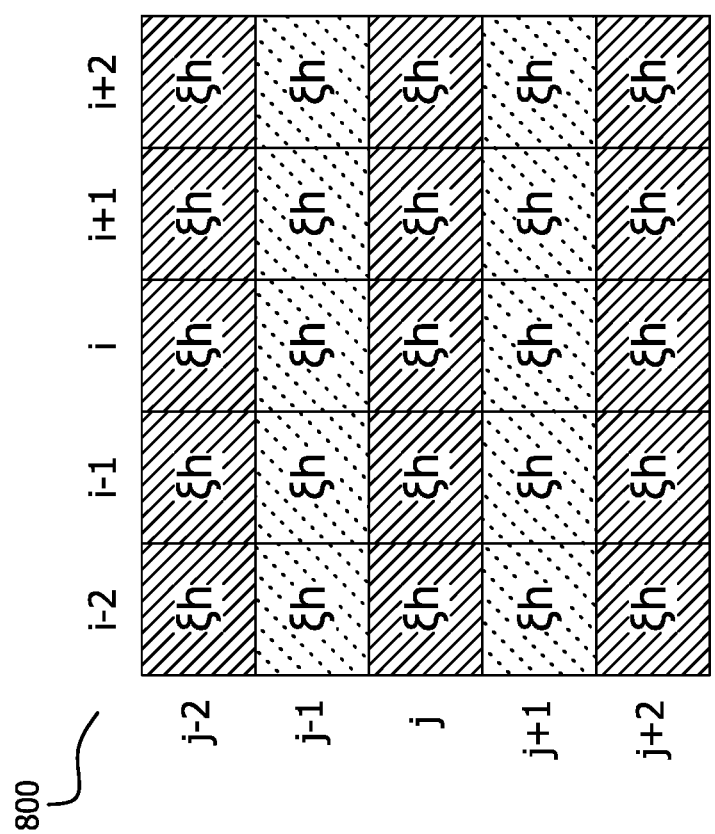
FIG. 9A illustrates the horizontal color differences at the pixel positions of the portion of the Bayer image.

FIG. 9A illustrates the horizontal color differences $\xi^h$ at the pixel positions of the portion of the Bayer image 800. FIG. 9B illustrates the vertical color differences $\xi^v$ at the pixel positions of the portion of the Bayer image 800.

The pixel differences in the horizontal and vertical directions are determined at block 610 as follows:

$$\text{diff}^h = (|P(j-1,i-2) - P(j-1,i-1)| + |P(j-1,i-1) - P(j-1,i)| + |P(j-1,i) - P(j-1,i+1)| + |P(j-1,i+1) - P(j-1,i+2)| + 2 \times [|P(j,i-2) - P(j,i-1)| + |P(j,i-1) - P(j,i)| + |P(j,i) - P(j,i+1)| + |P(j,i+1) - P(j,i+2)|] + |P(j+1,i-2) - P(j+1,i-1)| + |P(j+1,i-1) - P(j+1,i)| + |P(j+1,i) - P(j+1,i+1)| + |P(j+1,i+1) - P(j+2,i+1)|)/2$$

$$\text{diff}^v = (|P(j-2,i-1) - P(j-1,i-1)| + |P(j-1,i-1) - P(j,i-1)| + |P(j,i-1) - P(j+1,i-1)| + |P(j+1,i-1) - P(j+2,i-1)| + 2 \times [|P(j-2,i) - P(j-1,i)| + |P(j-1,i) - P(j,i)| + |P(j,i) - P(j+1,i)| + |P(j+1,i) - P(j+2,i)|] + |P(j-2,i+1) - P(j-1,i+1)| + |P(j-1,i+1) - P(j,i+1)| + |P(j,i+1) - P(j+1,i+1)| + |P(j+1,i+1) - P(j+2,i+1)|)/2$$

The N-direction weightings α' are then determined at block 612. In this example, 4 directions are used. However, features of the present disclosure can be implemented by determining weightings in more than 4 directions. In this example, the 4 directional weightings at (j,i) and their sum are determined as follows:

$$\alpha'_E = \Delta_E^{-2} \times \frac{(diff^h)^{-2}}{(diff^h)^{-2} + (diff^v)^{-2}}$$

$$\alpha'_W = \Delta_W^{-2} \times \frac{(diff^h)^{-2}}{(diff^h)^{-2} + (diff^v)^{-2}}$$

$$\alpha'_N = \Delta_N^{-2} \times \frac{(diff^v)^{-2}}{(diff^h)^{-2} + (diff^v)^{-2}}$$

$$\alpha'_S = \Delta_S^{-2} \times \frac{(diff^v)^{-2}}{(diff^h)^{-2} + (diff^v)^{-2}}$$

$$\text{Sum} = \alpha'_E + \alpha'_W + \alpha'_N + \alpha'_S$$

Color differences for the current pixel $P_1$ are determined at block 614. That is, the color difference between the second color component (C2) and the first color component (C1)) (i.e., $\xi_E^{G-R}$) for the current pixel $P_1$ as well as the color difference between the second color component (C2) and the third color component (C3) (i.e., $\xi^{G-B}(j, i)$) are determined at block 614, as follows:

$$\xi^{G-R}(j,i) = \xi_E^{G-R}(j,i) \times \alpha_E + \xi_W^{G-R}(j,i) \times \alpha_W + \xi_N^{G-R}(j,i) \times \alpha_N + \xi_S^{G-R}(j,i) \times \alpha_S$$

$$\xi^{G-B}(j,i) = \xi_E^{G-B}(j,i) \times \alpha_E + \xi_W^{G-B}(j,i) \times \alpha_W + \xi_N^{G-B}(j,i) \times \alpha_N + \xi_S^{G-B}(j,i) \times \alpha_S$$

where, $$\xi_E^{G-R}(j, i) = \begin{cases} \dfrac{\lambda_0 \times \xi^h(j, i) + \lambda_1 \times \xi^h(j, i+1) + \lambda_2 \times \xi^h(j, i+2)}{\lambda_0 + \lambda_1 + \lambda_2} & \text{if } P_1 = \text{red or } P_2 = \text{red} \\ \dfrac{\xi^h(j-1, i) + \xi^h(j+1, i)}{2} & \text{if } P_1 = \text{blue or } P_2 = \text{blue} \end{cases}$$

$$\xi_W^{G-R}(j, i) = \begin{cases} \dfrac{\lambda_0 \times \xi^h(j, i) + \lambda_1 \times \xi^h(j, i+1) + \lambda_2 \times \xi^h(j, i-2)}{\lambda_0 + \lambda_1 + \lambda_2} & \text{if } P_1 = R \text{ or } P_2 = R \\ \dfrac{\xi^h(j-1, i) + \xi^h(j+1, i)}{2} & \text{if } P_1 = B \text{ or } P_2 = B \end{cases}$$

$$\xi_N^{G-R}(j, i) = \begin{cases} \dfrac{\lambda_0 \times \xi^v(j, i) + \lambda_1 \times \xi^v(j-1, i) + \lambda_2 \times \xi^v(j-2, i)}{\lambda_0 + \lambda_1 + \lambda_2} & \text{if } P_1 = R \text{ or } P_3 = R \\ \dfrac{\xi^v(j, i-1) + \xi^v(j, i+1)}{2} & \text{if } P_1 = B \text{ or } P_3 = B \end{cases}$$

$$\xi_S^{G-R}(j, i) = \begin{cases} \dfrac{\lambda_0 \times \xi^v(j, i) + \lambda_1 \times \xi^v(j+1, i) + \lambda_2 \times \xi^v(j+2, i)}{\lambda_0 + \lambda_1 + \lambda_2} & \text{if } P_1 = R \text{ or } P_3 = R \\ \dfrac{\xi^v(j, i-1) + \xi^v(j, i+1)}{2} & \text{if } P_1 = B \text{ or } P_3 = B \end{cases}$$

As described above, the light for each pixel of an image is Bayer filtered to record an R (red) component, a G (green) component or a B (blue) component. Accordingly, the raw data of the Bayer filtered current pixel $P_1$ to be interpolated corresponds to an R component, a G component or a B component. The RGB color value (e.g., full color value) of the current pixel $P_1$ is then interpolated by determining the missing color components (i.e., the other two color components not representing the current pixel $P_1$ from the raw data) for the current pixel $P_1$ are determined at block 616 as follows:

if the current pixel $P_1$=R:

$$R = P(j,i)$$

$$G = P(j,i) + \xi^{G-R}(j,i)$$

$$B = P(j,i) + \xi^{G-R}(j,i) - \xi^{G-B}(j,i)$$

if the current pixel $P_1$=G:

$$R = P(j,i) - \xi^{G-R}(j,i)$$

$$G = P(j,i)$$

$$B = P(j,i) - \xi^{G-B}(j,i)$$

if the current pixel $P_1$=B:

$$R = P(j,i) + \xi^{G-B}(j,i) - \xi^{G-R}(j,i);$$

$$G = P(j,i) + \xi^{G-B}(j,i)$$

$$B = P(j,i)$$

Due to the features described above, the local structure similarity between color components is leveraged to calculate linear model parameters. Features of the present disclosure efficiently interpolate color coefficients while maintaining high image quality in regions having different image content.

In addition, directional fusion weightings are calculated on integrated gradients, resulting in more accurate directional weightings than conventional techniques.

Further, missing RGB color components of pixels of a Bayer image are efficiently reconstructed together to reproduce an RGB color image, in contrast to conventional methods which interpolate G components separate from (i.e., prior to) the R and B components.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, 318, the input driver 112, the input devices 108, the output driver 114, the output devices 110, the accelerated processing device 116, the scheduler 136, the graphics processing pipeline 134, the compute units 132, the SIMD units 138, the camera 306 and image sensor 310 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An image processing device comprising:
   memory; and
   one or more processors that are communicatively coupled to the memory, wherein the one or more processors are collectively configured to:
      obtain a Bayer image that is formed from a plurality of pixels;
      determine directional color difference weightings in both a horizontal direction and a vertical direction, wherein the directional color different weightings are calculated based on color difference gradients and color variances surrounding a first pixel among the plurality of pixels;
      determine a color difference that comprises a first color difference and a second color difference based on the determined directional color difference weightings surrounding the first pixel, wherein the first color difference is between a first color component and a second color component and the second color difference is between the second color component and a third color component;
      interpolate a color value of the first pixel based on the directional color difference weightings and the color differences to generate an interpolated color value; and
      generate a color image based on the Bayer image using the interpolated color value.

2. The image processing device of claim 1, wherein the one or more processors are collectively configured to:
   determine a linear slope and pixel position offset in a horizontal direction; and
   determine a linear slope and pixel position offset in a vertical direction.

3. The image processing device of claim 1, wherein the one or more processors are collectively configured to:
   determine the color difference between the first color component and the second color component based on color difference gradients of the first color component and the second color component; and
   determine the color difference between the second color component and a third color component based on color difference gradients of the second color component and the third color component.

4. The image processing device of claim 3, wherein the one or more processors are collectively configured to:
   determine pixel color differences in the horizontal direction and the vertical direction for the pixels in the Bayer image; and
   determine the directional color difference weightings based on:
   the pixel color differences in the horizontal and the vertical direction;
   the color difference gradients of the first color component and the second color component; and
   the color difference gradients of the second color component and the third color component.

5. The image processing device of claim 3, wherein the one or more processors are collectively configured to:
   determine color difference gradients in two horizontal directions and two vertical directions; and
   determine the directional color difference weightings based on the color difference gradients.

6. The image processing device of claim 1, wherein the one or more processors are collectively configured to:
   determine a linear slope and a pixel position offset in a horizontal direction based on a horizontal color covariance, a horizontal color variance and horizontal mean color values; and
   determine a linear slope and pixel position offset in a vertical direction based on a vertical color covariance, a vertical color variance and vertical mean color values.

7. The image processing device of claim 1, further comprising a display device, wherein the color image is displayed on the display device.

8. The image processing device of claim 1, further comprising an image capturing device, wherein the Bayer image is a color filtered image of an image captured by the image capturing device.

9. A method of image demosaicing comprising:
   obtaining a Bayer image that is formed from a plurality of pixels;
   determining directional color difference weightings in a horizontal direction and a vertical direction, wherein the directional color different weightings are calculated based on color difference gradients and color variances surrounding a first pixel among the plurality of pixels;
   determining a color difference that comprises a first color difference and a second color difference based on the determined directional color difference weightings surrounding the first pixel, wherein the first color difference is between a first color component and a second color component and the second color difference is between the second color component and a third color component;
   interpolating a color value of the first pixel based on the directional color difference weightings and the color differences to generate an interpolated color value; and
   generating a color image based on the Bayer image using the interpolated color value.

10. The method of claim 9, further comprising:
    determining a linear slope and pixel position offset in a horizontal direction; and
    determining a linear slope and pixel position offset in a vertical direction.

11. The method of claim 9, further comprising:
determining the color difference between the first color component and the second color component based on color difference gradients of the first color component and the second color component; and
determining the color difference between the second color component and the third color component based on color difference gradients of the second color component and the third color component.

12. The method of claim 11, further comprising:
determining pixel color differences in the horizontal direction and the vertical direction for the pixels in the Bayer image; and
determining the directional color difference weightings based on:
the pixel color differences in the horizontal and the vertical direction;
the color difference gradients of the first color component and the second color component; and
the color difference gradients of the second color component and the third color component.

13. The method of claim 12, further comprising:
determining color difference gradients in two horizontal directions and two vertical directions; and
determining the directional color difference weightings based on the color difference gradients.

14. The method of claim 9, further comprising:
determining a linear slope and a pixel position offset in the horizontal direction based on a horizontal color covariance, a horizontal color variance and horizontal mean color values; and
determining a linear slope and a pixel position offset in the vertical direction based on a vertical color covariance, a vertical color variance and vertical mean color values.

15. The method of claim 9, further comprising displaying the color image on a display device.

16. The method of claim 9, further comprising acquiring an image, filtered by a Bayer filter array, via an image capturing device.

17. An image processing device comprising:
an image capturing device configured to capture an image;
an image sensor comprising a Bayer color filter array configured to color filter the image according to a first color component, a second color component, and a third color component; and
one or more processors collectively configured to:
obtain a Bayer image that is formed from a plurality of pixels and represented as one of the first color component, the second color component, and the third color component;
determine directional color difference weightings in both a horizontal direction and a vertical direction, wherein the directional color different weightings are calculated based on color difference gradients and color variances surrounding a first pixel among the plurality of pixels;
determine a color difference between the first color component and the second color component and a color difference between the second color component and the third color component based on the determined directional color difference weightings surrounding the pixel; and
interpolate a color value of the first pixel based on the directional color difference weightings and the color differences to generate an interpolated color value.

18. The image processing device of claim 17, wherein the one or more processors are collectively configured to:
determine a linear slope and pixel position offset in a horizontal direction; and
determine a linear slope and pixel position offset in a vertical direction.

19. The image processing device of claim 17, wherein the one or more processors are collectively configured to:
determine the color difference between the first color component and the second color component based on color difference gradients of the first color component and the second color component; and
determine the color difference between the second color component and a third color component based on color difference gradients of the second color component and the third color component.

20. The image processing device of claim 19, wherein the one or more processors are collectively configured to:
determine pixel color differences in the horizontal direction and the vertical direction for the pixels in the Bayer image; and
determine the directional color difference weightings based on:
the pixel color differences in the horizontal and the vertical direction;
the color difference gradients of the first color component and the second color component; and
the color difference gradients of the second color component and the third color component.

* * * * *